United States Patent

[11] 3,633,115

[72] Inventor Marvin A. Epstein
Monsey, N.Y.
[21] Appl. No. 30,788
[22] Filed Apr. 22, 1970
[45] Patented Jan. 4, 1972
[73] Assignee International Telephone and Telegraph Corporation
Nutley, N.J.

[54] DIGITAL VOLTAGE CONTROLLED OSCILLATOR PRODUCING AN OUTPUT CLOCK WHICH FOLLOWS THE PHASE VARIATION OF AN INPUT CLOCK
12 Claims, 3 Drawing Figs.

[52] U.S. Cl. .......... 328/63, 307/269, 328/72, 328/155, 331/25, 178/695
[51] Int. Cl. .......... H03k 5/00
[50] Field of Search .......... 307/208, 269; 328/63, 72, 133, 155; 331/18, 17, 25; 178/69.5

[56] References Cited

UNITED STATES PATENTS

| | | | |
|---|---|---|---|
| 2,980,858 | 4/1961 | Grondin et al. | 331/17 X |
| 3,217,267 | 11/1965 | Loposer | 331/17 X |
| 3,337,814 | 8/1967 | Brase et al. | 328/155 X |
| 2,934,604 | 4/1960 | Bizet | 178/69.5 |

*Primary Examiner*—Donald D. Forrer
*Assistant Examiner*—R. C. Woodbridge
*Attorneys*—C. Cornell Remsen, Jr., Walter J. Baum, Paul W. Hemminger, Percy P. Lantzy, Philip M. Bolton, Isidore Togut and Charles L. Johnson, Jr.

ABSTRACT: The digital VCO provides an output clock following the phase variation of an input clock where both the input and output clocks have the same average repetition frequency but rapid phase input clock variations are smoothed in the output clock. A local clock is produced having a repetition frequency equal to a given multiple L of the nominal repetition frequency of the output clock. A binary counter divides this local clock by a value N and through logic circuitry coupled to the binary counter and to the local clock provides a first clock signal having a repetition frequency equal to L times the nominal repetition frequency of the output clock with a missing pulse every N pulses and, in addition thereto, a second clock signal containing only, the missing pulses. A binary counter chain driven in an appropriate manner as described below by these clock signals provides the phase adjusted output clock with steps of 1/L period. The phase varying input clock and the phase adjusted output clock are each divided by a given factor M and phase compared by a clocked RS flip-flop thus, providing an input output phase comparison modulo M cycles. The output of this flip-flop is coupled to a JK flip-flop and is clocked by the missing pulse with the resultant output thereof being applied to a modulo-2 adder inserted between predetermined stages of the binary counterchain to bring about the desired phase adjustment of the output clock so as to follow the phase variation of the input clock. The binary counterchain is also driven by the first clock signal.

INVENTOR
MARVIN A. EPSTEIN
BY Alfred C. Hill
AGENT

INVENTOR
MARVIN A. EPSTEIN
BY Alfred C. Hill
AGENT

DIGITAL VOLTAGE CONTROLLED OSCILLATOR PRODUCING AN OUTPUT CLOCK WHICH FOLLOWS THE PHASE VARIATION OF AN INPUT CLOCK

BACKGROUND OF THE INVENTION

This invention relates to oscillators and more particularly to a voltage controlled oscillator (VCO) whose output signal is controlled to be in phase synchronism with or to follow with some smoothing the phase variation of an input signal.

In recent years, VCO's have been employed in many systems, such as binary data processing systems, pulse code modulation (PCM), time division multiplex (TDM) communication systems and FM (frequency modulation) communication systems to produce a clock that varies in phase synchronism with or follows the phase variation of a given component of another signal present in the above mentioned systems. More particularly, VCO's of this type produce a local clock signal in response to the bit or frame rate of a binary coded signal which, in turn, is used to control the processing of the binary signal, such as waveform regeneration, distribution of the multiplex channels to the proper channel and for demodulation, such as decoding the binary data or recovering the FM signal.

More recently, VCO's have been found to be a necessary component in systems which multiplex and process asynchronous data streams. The VCO's are used to follow the phase variation of the modified bit stream clocks while at the same time smoothing out large discontinuities of phase which have occurred in the course of the processing of the input data streams.

In the above-mentioned prior art systems and other similar systems, the VCO has been of the analog type and has been employed in a phase locked loop or a frequency following circuit arrangement. The phase locked loop has been primarily employed with binary data processing and communication systems while the frequency following circuits have been employed for detection of an FM signal and is commonly referred to as an FM feedback detector.

Summary of the invention

An object of the present invention is to provide a digital VCO that may be employed in place of the previously employed analog VCO.

A feature of the present invention is the provision of a digital VCO to produce an output clock having a given repetition frequency following the phase variation of an input clock having the given repetition frequency comprising a source of the input clock; first means to generate a local clock having a repetition frequency equal to a given multiple L of the nominal value of said given repetition frequency and to generate at least a first timing signal having a given activating interval, where L is an integer greater than one; second means coupled to the first means responsive to the local clock and to the first timing signal to produce the output clock; and third means coupled to the source, the first means and the second means responsive to the first timing signal and the phase relation between the input clock and the output clock to control the production of the output clock to follow the phase variation of the input clock.

BRIEF DESCRIPTION OF THE DRAWING

The above-mentioned and other features and objects of this invention will become more apparent by reference to the following description taken in conjunction with the accompanying drawings, in which.

DESCRIPTION OF THE PREFERRED EMBODIMENT

Figures 1, 2:
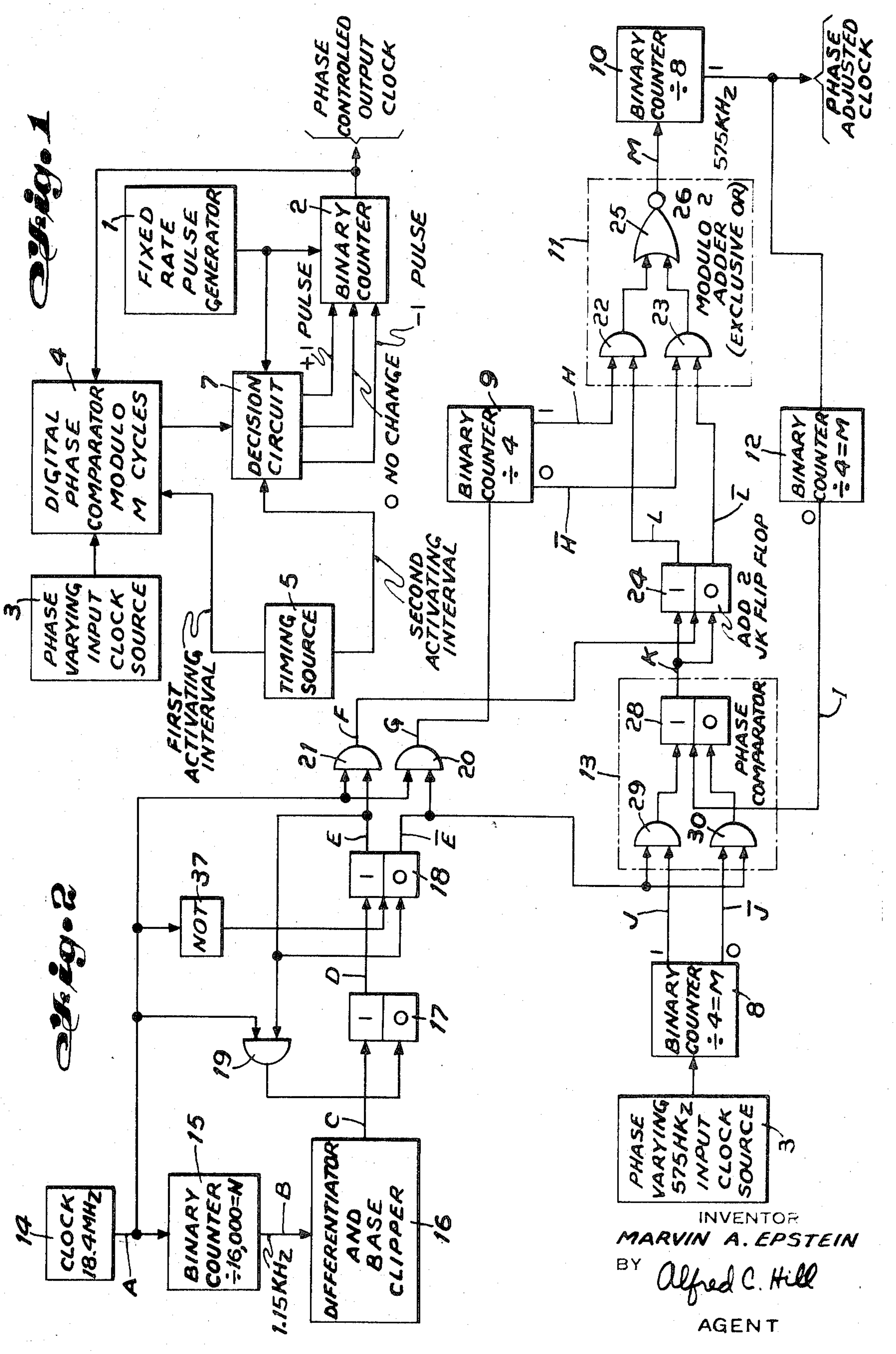
FIG. 1 is a block diagram illustrating the basic concept of the present invention.
FIG. 2 is a block diagram illustrating one embodiment of the broad concept of FIG. 1 in accordance with the principles of the present invention.

Referring to FIG. 1, there is illustrated therein in block diagram form the basic concept of a digital VCO in accordance with the principles of the present invention. Fixed rate pulse generator 1 having a repetition frequency equal to a given multiple L of the nominal repetition frequency of the desired output clock of the VCO is coupled to binary counter 2 to produce the desired output clock having a given average repetition frequency. Generator 1 is also coupled to decision circuit 7 to synchronize the operation thereof. The output of counter 2 together with the phase varying input clock from source 3 having said given average repetition frequency is coupled to digital phase comparator 4 which compares the phase of the two clocks modulo M cycles. Comparator 4, controlled by a first timing signal of timing source 5, is activated only during a first activating interval and is prevented from changing its state during a defined interval in this timing signal so that the output error signal is not interfered with. Phase comparator 4 operates modulo M cycles by appropriately dividing both the input clock and output clock by a given factor M prior to application to a digital phase comparator which produces the phase error signal. Timing source 5 also provides a second timing signal having a second activating interval which is employed in decision circuit 7 together with the phase error output of comparator 4 to produce one of three signals for coupling to counter 2 which is used to change the count of counter 2 so that the output clock for the VCO of this invention is phase controlled to follow the phase variation of the input clock from source 3. It will be apparent that decision circuit 7 can be modified to add or subtract *n* pulses. One output from decision circuit 7 represents no change and, hence, a substantially inphase condition between the input and output clocks during the second activating interval or in the absence of the second activating interval. Another output produced by circuit 7 adds one pulse at an appropriate location of counter 2 to advance the count thereof so that the output clock follows the phase variation of the input clock. The third output from decision circuit 7 subtracts one pulse at an appropriate location in counter 2 to retard the count of counter thereof so that the output clock follows the phase variation of the input clock. These latter two outputs from decision circuit 7 occur only during the second activating interval.

As mentioned hereinabove phase comparator 4 operates modulo M cycles.

The advantage obtained in this arrangement is that the pull-in range of the digital VCO is increased relative to that pull-in range which would be obtained if the input and output clocks were not frequency divided prior to application to the phase comparator of phase comparator 4.

Turning now to FIG. 2, there is illustrated therein in block diagram form one embodiment of achieving the broad concept illustrated and described with respect to FIG. 1. FIG. 2 illustrates therein various frequencies and division factors. It should be noted, however, that these values are illustrated only for purposes of explanation and may be appropriately modified to meet any desired situation.

Figure 3:
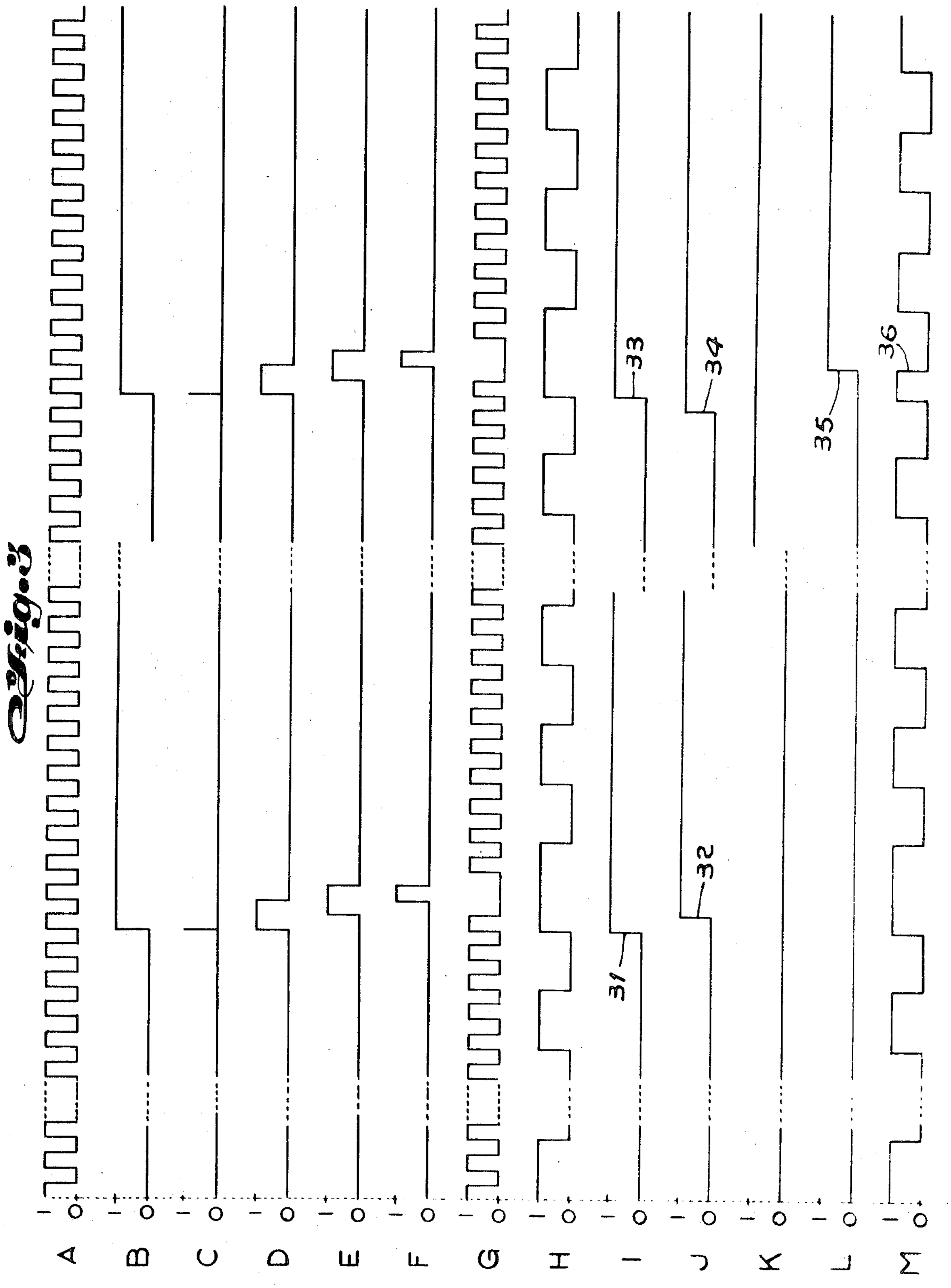
FIG. 3 illustrates a series of timing diagrams occurring at various identified points in the circuit arrangement of FIG. 2 useful in explaining the operation thereof.

In addition, certain points within the circuit of FIG. 2 are labeled by letters and these letters identify the timing waveform present at these points in the circuit as illustrated in FIG. 3. With respect to FIG. 3 no attempt has been made to illustrate the timing waveforms to scale, but FIG. 3 serves to illustrate the relative timing curves present in the circuit of FIG. 2 to bring about the desired phase control of the generated phase adjusted local clock.

The phase varying input clock from source 3 is coupled to a binary counter 8 arranged to provide a division $M=4$ of the 575 kHz. (kilohertz) input clock. Binary counter 8 forms one portion of phase comparator 4 of FIG. 1. A counterchain including binary counter 9 and binary counter 10 having interposed therebetween modulo-2 adder 11 generates a phase adjusted local clock of 575 kHz. The counter chain including counters 9 and 10 together with modulo 2-adder 11 and AND 20 is represented in FIG. 1 by binary counter 2. The output of counter 10 is coupled to counter 12 and has a division factor of $M=4$ to provide a reference input for phase comparator 13. Binary counter 12 and phase comparator 13 form still another portion of the digital phase comparator 4 of FIG. 1.

Let us consider now how counter 10 produces a clock which is phase adjusted to follow the phase variation of the input clock from source 3 in accordance with the principles of this invention. A master clock 14 produces a 18.4 MHz (megahertz) clock as illustrated in curve A, FIG. 3. The output of clock 14 is coupled to binary counter 15 and results in a division of $N=16{,}000$ to produce a waveform of 1.15 kHz. at its output as illustrated in Curve B, FIG. 3. The output of counter 15 is coupled to a positive pulse extractor, such as differentiator and base clipper 16, to produce the waveform illustrated in Curve C, FIG. 3. The output of differentiator and base clipper 16 is coupled to an unclocked RS flip-flop 17 which produces an output as illustrated in Curve D, FIG. 3. The output of flip-flop 17 is coupled to a clock RS flip-flop 18 such that the "1" output from flip-flop 17 is applied to the set input of flip-flop 18. The clock input of flip-flop 18 is provided by the output of NOT 37 coupled to the output of clock 14. The "1" output of flip-flop 18 is illustrated in Curve E, FIG. 3 and is coupled directly to the reset input of flip-flop 18 and through AND 19, clocked by the output of clock 14, to the reset input of flip-flop 17. The "0" output of flip-flop 18 is identified as $\bar{E}$ and is the complement of Curve E, FIG. 3. AND 20 is coupled to the "0" output of flip-flop 18 to produce under control of the clock from clock 14 a local clock signal having repetition rate of 18.4 MHz with a missing pulse every N pulses of this local clock. In the present illustration the missing pulse of the output of AND 20, illustrated in curve G, FIG. 3 occurs at a 1.15 kHz. rate. This clock signal from AND 20 drives the counter chain including counters 9 and 10. AND 21 is coupled to the "1" output of flip-flop 18 and is clocked by the output of clock 14 to produce the missing pulse as illustrated in curve F, FIG. 3. This timing signal output includes the second activating interval.

The "1" output of the second flip-flop of counter 9 is shown in curve H, FIG. 3 while the "0" output of the same flip-flop of counter 9 is the complement $\bar{H}$ of the H waveform, FIG. 3. These two outputs are applied to two ANDs 22 and 23 of adder 11 as illustrated. The other input for ANDs 22 and 23 are provided from the output of the add 2 JK flip-flop 24, as illustrated, the operation of which will be explained in conjunction with phase comparator 13 hereinbelow. The output from ANDs 22 and 23 are coupled to OR 25 and then to a NOT 26 thereby providing a modulo-2 adder in one of the well-known forms of an EXCLUSIVE OR.

As mentioned hereinabove the phase varying input clock was divided by counter 8 to produce a waveform J, FIG. 3 and its complement $\bar{J}$ and the output of counter 10 was similarly divided by counter 12 to produce the phase reference waveform I, FIG. 3. Phase comparator 13 includes an RS flip-flop 28 which has its clock input coupled to the "0" output of counter 12, its set input connected to the "1" output of counter 8 through means of AND 29 and its reset input coupled to the the "0" output of counter 8 through AND 30. ANDs 29 and 30 receive on their second input the first activating interval timing signal derived from the "0" output of flip-flop 18 which is the complement of waveform E, FIG. 3 and has the purpose of preventing a change of state in flip-flop 28 during the missing pulse interval, the interval during which phase adjustment of the local output clock is produced. The "1" output of flip-flop 28 illustrated in curve K, FIG. 3 is coupled to both the set and reset inputs of JK flip-flop 24. The clock input of flip-flop 24 is provided by the output of AND 21 which is the missing pulse shown in curve F, FIG. 3. The "1" output of flip-flop 24 is shown in curve L, FIG. 3 and is coupled as one input of AND 22 while the complement of this curve is present at the "0" output of flip-flop 24 and is coupled to the second input of AND 23.

Let us consider now with greater detail how the phase adjustment of the local clock produced by the counterchain including counters 9 and 10 is achieved. Let us consider first the relative phase relationship between the J and I signals applied to flip-flop 28 in the vicinity of a missing pulse as illustrated at points 31 and 32 of curves G, I and J, FIG. 3. When the rising edge 31 of curve I is applied to the clock input of flip-flop 28, the J input passed through AND 29, which is enabled by the complement of curve E, FIG. 3, is a "0" and the $\bar{J}$ input passed through AND 30, which is also enabled by the complement of curve E, FIG. 3, is a "1." Thus flip-flop 28 will be in a "0" state and the output K is "0" when the missing pulse on output of AND 21 arrives. With this output from flip-flop 28, JK flip-flop 24 will remain in the same state which in this case is a "0" output for curve L while the complement $\bar{L}$ is in a "1" condition. This will permit the complement of curve H to drive counter 10 and thereby maintain the local phase adjusted clock at the input of counter 10 as shown in curve M, FIG. 3 with a missing pulse which, in effect, corresponds to the application of a −1 pulse from decision circuit 7 to binary counter 2 of FIG. 1.

Now let us consider what happens when curves I and J have the phase relation illustrated at points 33 and 34 of these curves. With this condition flip-flop 28 will have a "1" condition applied to its set input at the time the positive going edge 33 of curve I, FIG. 3 clocks flip-flop 28 thereby resulting in a "1" output as shown in curve K, FIG. 3 when the missing pulse at output of AND 21 arrives. This will result in a "1" input to both the set and reset inputs of JK flip-flop 24 whose output will be complemented by the application of the missing pulse to the clock input of flip-flop 24 from AND 21 resulting in the waveform 35 shown in curve L. Waveforms L and $\bar{L}$ are coupled to adder 11 provide additional transition 36 at the input of counter 10 as illustrated in curve M, FIG. 3. This one additional transition applied to the counterchain including counters 9 and 10 in the position illustrated effectively adds two counts to the output clock thereby advancing the phase of the clock by two which in conjunction with the effect of the missing pulse at the counter 9 corresponds to the application of +1 pulse from decision circuit 7 to counter 2 of FIG. 1. The overall effect of these operations is to cause the phase variations of the output signal of counter 10 to follow the phase variation of the output signal of source 3.

It should be noted that the digital VCO of this invention provides an output clock which is either leading or lagging the phase of the input clock, but is never really coincident therewith. This lack of coincidences is a natural outcome of the fact that the input clock can change phase in a continuous fashion, but the corrections to the phase adjusted clock in the present implementations occur in quantized steps related to the period of clock 14. One advantage of this arrangement is that the maximum frequency offset of the output clock from the nominal clock is limited by the step size and the frequency of activating intervals thereby providing smoothing of the input clock. It has been determined that with appropriately small step size and an appropriate limitation on frequency offset from nominal the phase of the local clock follows the phase of the input clock close enough and with sufficient smoothing so that the phase error present between the two clocks enables meeting rather rigorous requirements and specification for a contemporary asynchronous TDM combiner and decombiner circuit arrangements for which the VCO of the present invention has been developed.

While I have described above the principles of my invention in connection with specific apparatus, it is to be clearly understood that this description is made only by way of example and not as a limitation to the scope of my invention as set forth in the objects thereof and in the accompanying claims.

I claim:

1. A digital voltage controlled oscillator to produce an output clock having a given repetition frequency following the phase variation of an input clock having said given repetition frequency comprising:

a source of said input clock;

first means to generate a local clock having a repetition frequency equal to a given multiple L of the nominal value of said given repetition frequency and to generate at least a first timing signal having a given activating interval, where L is an integer greater than one;

second means coupled to said first means responsive to said local clock to produce said output clock; and third means coupled to said source, said first means and said second means responsive to said first timing signal and the phase relation between said input clock and said output clock to control said second means to cause said output clock to follow the phase variation of said input clock.

2. An oscillator according to claim 1, wherein said first means includes means to generate said local clock having a missing pulse every N pulses of said local clock, where N is an integer greater then one, and to generate as said first timing signal said missing pulse.

3. An oscillator according to claim 2, wherein said second means includes a binary counter chain; and said third means includes a digital phase comparator coupled to said source and the output of said counterchain to detect the phase relation between said input clock and said output clock, and a decision circuit coupled to said first means, said phase comparator and a given location in said counter chain responsive to the output of said phase comparator and said missing pulse to adjust the counting of said counter chain according to the detected phase relation between said input clock and said output clock.

4. An oscillator according to claim 2, wherein said first means includes a generator of said local clock, a binary counter coupled to said generator to divide the frequency of said clock by N, and logic circuitry coupled to said generator and said counter to generate said local clock and said missing pulse.

5. An oscillator according to claim 4, wherein said logic circuitry includes a first RS flip-flop having its set input coupled to said counter, a second RS flip-flop having its set input coupled to the "1" output of said first flip-flop and its clock input coupled to said generator, the "1" output of said second flip-flop being coupled to the reset input of said second flip-flop, a first AND having two inputs and output coupled to the reset input of said first flip-flop, one of said two inputs being coupled to said generator and the other of said two inputs being coupled to the "1" output of said second flip-flop, a second AND having two inputs and an output to provide said missing pulse, one of said two inputs being coupled to the "1" output of said second flip-flop and the other of said two inputs being coupled to said generator, and a third AND having two inputs and an output to provide said local clock, one of said two inputs being coupled to the "0" output of said second flip-flop and the other of said two inputs being coupled to said generator.

6. An oscillator according to claim 2, wherein said second means includes a binary counter chain.

7. An oscillator according to claim 6, wherein said third means includes a digital phase comparator coupled to said source and the output of said counter chain to detect the phase relation between said input clock and said output clock, a JK flip-flop having a set input, a reset input and a clock input, said set and reset inputs being coupled to the output of said phase comparator and said clock input being coupled to said first means responsive to said missing pulse, and a modulo-2 adder coupled to the "1" and "0" outputs of said JK flip-flop and between predetermined stages of said counter chain to adjust the counting of said counterchain to provide said output clock at the output of said counterchain.

8. An oscillator according to claim 7, wherein said phase comparator includes an RS flip-flop having a set input, a reset input and a clock input at least one of said set and reset inputs being coupled to said source and said clock input being coupled to the output of said counterchain.

9. An oscillator according to claim 8, further including a first binary counter having a given count coupled between said source and both said set and reset inputs of said RS flip-flop, and a second binary counter having said given count coupled between the output of said counterchain and said clock input of said RS flip-flop.

10. An oscillator according to claim 9, wherein said first means further generates a second timing signal defining an interval during which said RS flip-flop cannot change its state, and further including a first AND having two inputs and an output coupled to the set input of said RS flip-flop, one of said two inputs being coupled to one of the two outputs of said first counter and the other of said two inputs being coupled to said first means responsive to said second timing signal, and a second AND having two inputs and an output coupled to the reset input of said RS flip-flop, one of said two inputs being coupled to the other of the two outputs of said first counter and the other of said two inputs being coupled to said first means responsive to said second timing signal.

11. An oscillator according to claim 2, wherein said third means includes a digital phase comparator coupled to said source and the output of said second means to detect the phase relation between said input clock and said output clock, a JK flip-flop having a set input, a reset input and a clock input, said set and reset inputs being coupled to the output of said phase comparator and said clock input being coupled to said first means responsive to said missing pulse, and a modulo-2 adder coupled to the "1" and "0" outputs of said JK flip-flops and to a given location within said second means to adjust the phase of said output clock.

12. An oscillator according to claim 2, wherein said first means includes a generator of said local clock, a first binary counter coupled to said generator to divide the frequency of said clock by N, a first RS flip-flop having its set input coupled to said first counter, a second RS flip-flop having its set input coupled to the "1" output of said first flip-flop, the "1" output of said second flip-flop being coupled to the reset input of said second flip-flop.

a NOT coupled between said generator and the clock input of said second flip-flop, a first AND having two inputs and an output coupled to the reset input of said first flip-flop, one of said two inputs being coupled to said generator and the other of said two inputs being coupled to the "1" output of said second flip-flop, a second AND having two inputs and an output to provide said missing pulse, one of said two inputs being coupled to the "1" output of said second flip-flop and the other of said two inputs being coupled to said generator, and a third AND having two inputs and an output to provide said local clock, one of said two inputs being coupled to the "0" output of said second flip-flop and the other of said two inputs being coupled to said generator;

said second means includes a binary counter chain having its input coupled to the output of said third AND: and said third means includes a second binary counter having a given count coupled to said source, a third binary counter having said given count coupled to the output of said counterchain, a third RS flip-flop having a set input, a reset input and a clock input, said set input being coupled to the "1" output of said second counter, said reset input being coupled to the "0" output of said second counter and said clock input being coupled to one of the "1" and "0" outputs of said third counter, a JK flip-flop having a set input, a reset input and a clock input, said set and reset inputs being coupled to the "1" output of said third RS flip-flop and said clock input being coupled to the output of said second AND, and a modulo-2 adder coupled to the "1" and "0" outputs of said JK flip-flop and between predetermined stages of said counterchain to adjust the counting of said counter chain to provide said output clock at the output of said counterchain.

* * * * *